United States Patent
Mungas et al.

(10) Patent No.: US 7,889,443 B2
(45) Date of Patent: Feb. 15, 2011

(54) CAMERA, HANDLENS, AND MICROSCOPE OPTICAL SYSTEM FOR IMAGING AND COUPLED OPTICAL SPECTROSCOPY

(76) Inventors: Greg S. Mungas, 411 E. Huntington Dr., Ste 107-245, Arcadia, CA (US) 91006; John Boynton, 278 E. Colorado Blvd., Apt. 1626, Pasadena, CA (US) 91101; Cesar A. Sepulveda, Glendale, CA (US); Alicia Nunes de Sepulveda, legal representative, Rousseau No. 66, Mexico City, DF (MX) 11590; Yekta Gursel, 5444 Baldwin Ave., Temple City, CA (US) 91780-2624

( * ) Notice: Subject to any disclaimer, the term of this patent is extended or adjusted under 35 U.S.C. 154(b) by 174 days.

(21) Appl. No.: 12/134,987

(22) Filed: Jun. 6, 2008

(65) Prior Publication Data
US 2009/0135495 A1   May 28, 2009

Related U.S. Application Data

(60) Provisional application No. 60/933,418, filed on Jun. 6, 2007.

(51) Int. Cl.
G02B 9/64 (2006.01)
G02B 9/04 (2006.01)

(52) U.S. Cl. .................................. 359/755; 359/793

(58) Field of Classification Search ................ 359/691, 359/692, 793–795, 755
See application file for complete search history.

(56) References Cited

U.S. PATENT DOCUMENTS

| 4,398,808 | A | 8/1983 | Fujibayashi | 359/686 |
| 5,032,013 | A | 7/1991 | Shibayama | 359/684 |
| 5,381,270 | A * | 1/1995 | Cho | 359/692 |
| 5,696,633 | A | 12/1997 | Nakajima | 359/691 |
| 2006/0172452 | A1 | 8/2006 | Seyfried et al. | 438/70 |

OTHER PUBLICATIONS

International Search Report for PCT/US2008/066096 filed on Jun. 6, 2008 in the name of California Institute of Technology.
Written Opinion for PCT/US2008/066096 filed on Jun. 6, 2008 in the name of California Institute of Technology.
Felman, W.C., et al. Evidence for water ice near the lunar poles. J. Geo. Res., vol. 106, No. E10, pp. 23,230-23,251, Oct. 25, 2001.
Boynton, J., et al. CHAMP: Camera, Handlens, and Microscope Probe, IEEEAC paper #1510, 2005.

* cited by examiner

Primary Examiner—William C Choi

(57) ABSTRACT

An optical system comprising two lens cells, each lens cell comprising multiple lens elements, to provide imaging over a very wide image distance and within a wide range of magnification by changing the distance between the two lens cells. An embodiment also provides scannable laser spectroscopic measurements within the field-of-view of the instrument.

11 Claims, 3 Drawing Sheets

CAMERA, HANDLENS, AND MICROSCOPE OPTICAL SYSTEM FOR IMAGING AND COUPLED OPTICAL SPECTROSCOPY

PRIORITY CLAIM

This application claims the benefit of U.S. Provisional Application No. 60/933,418, filed 6 Jun. 2007.

GOVERNMENT INTEREST

The invention described herein was made in the performance of work under a NASA contract, and is subject to the provisions of Public Law 96-517 (35 USC 202) in which the Contractor has elected to retain title.

FIELD

The present invention relates to optics.

BACKGROUND

In many applications, such as for example, scientific instrumentation and space exploration, it may be desirable to have a single optical system that is relatively compact, yet usable for imaging objects over a very wide range of distances and over a very wide range of magnification.

DESCRIPTION OF EMBODIMENTS

In the description that follows, the scope of the term "some embodiments" is not to be so limited as to mean more than one embodiment, but rather, the scope may include one embodiment, more than one embodiment, or perhaps all embodiments.

Figure 1:
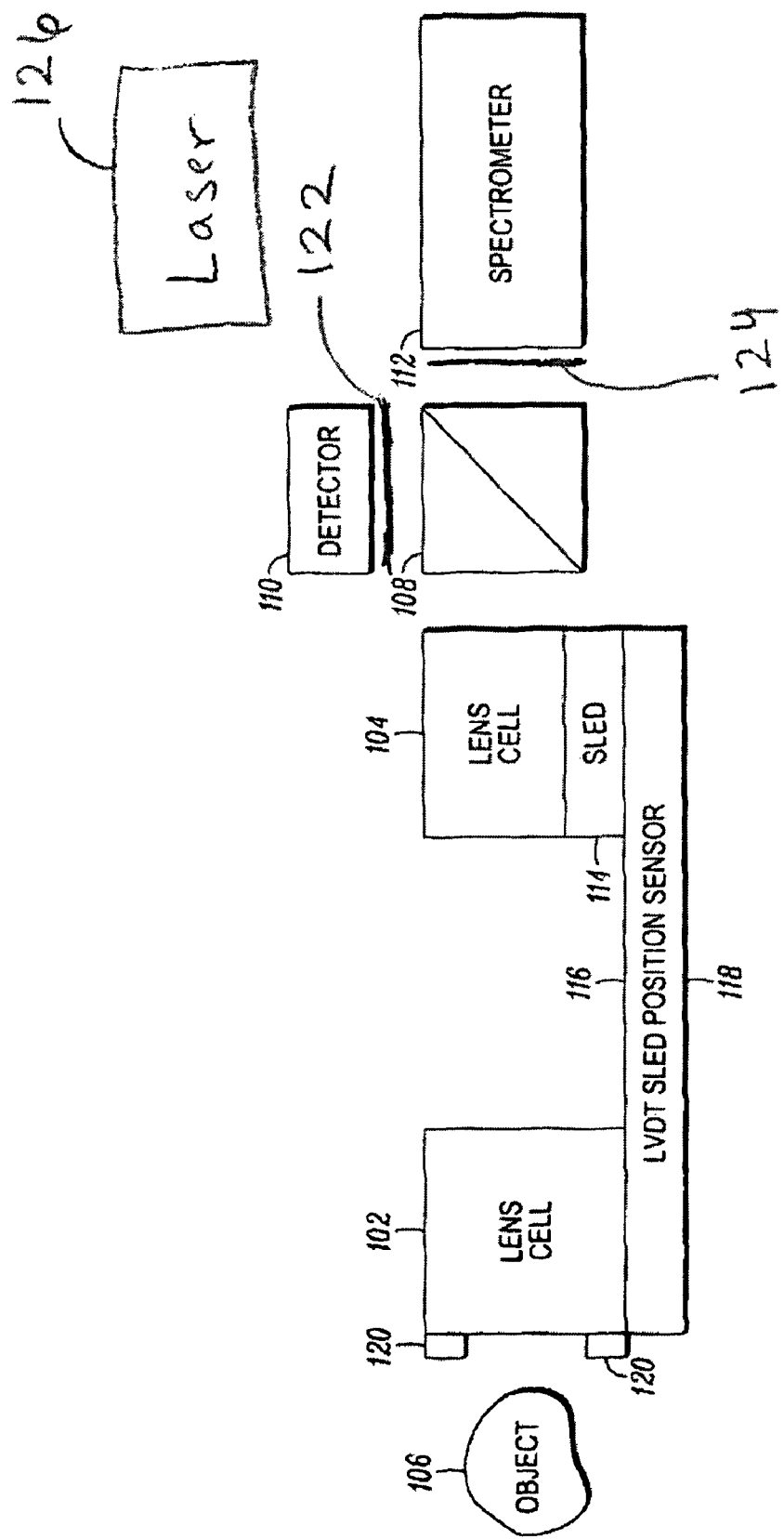
FIG. 1 illustrates a simplified schematic of an optical system according to an embodiment.

FIG. 1 illustrates a simplified schematic of an imaging system according to an embodiment. The system of FIG. 1 comprises two lens cells (or multi-element lenses), lens cell 102 and lens cell 104. Each lens cell comprises a number of lens elements, which will be described with reference to the other drawings. Object 106 is imaged by the imaging system, where the light rays from object 106 are split by splitter 108 so that an image of object 106 may be provided to detector 110, and light rays from object 106 may be further analyzed by spectrometer 112. For example, spectrometer 112 may comprise components and detectors to perform Raman, Laser-Induced Breakdown (LIBS), or Fluorescence and Reflectance spectroscopy.

Lens cell 104 is coupled to sled 114. A motor (not shown) may move sled 114 so that the distance between lens cell 102 and lens cell 104 may be varied. The relative position of lens cell 104 may be measured by way of LVDT (Linear Variable Differential Transformer) sled position sensor 118. Other embodiments may use other mechanical devices to vary the distance between lens cell 102 and lens cell 104. In this way, lens cells 102 and 104 may be translated axially relative to one another so as to continuously vary the system focal length and magnification. This allows the optical system to provide a wide range of imaging functions, from camera, to hand-lens, to microscope. The closer the optical system is placed to object 106, the higher the resultant magnification (at the cost of a smaller field of view). It is expected that embodiments may provide an image resolution of 1 micron per pixel at peak magnification in the visible wavelength range, and a field of view that may be fully or selectively scanned with a laser spot comparable to the imaging resolution, e.g., 1 to 10 microns at peak magnification.

An embodiment imaging system may incorporate a beam-split optical path, so as to provide two focal planes, labeled 122 and 124 in FIG. 1. With detector 110 placed at focal plane 122, the second focal plane, 124, may be termed a conjugate focal plane. A split optical path provides co-registering of the various optical spectroscopic measurements with imaging as described above. The optical design, in addition to the imaging functions described above, allows the entire object plane to be probed with any of the aforementioned spectroscopy techniques using a diffraction-limited laser spot profile. In such applications, laser 126 provides a laser beam that is focused onto conjugate focal plane 124. (Remembering that FIG. 1 is a simplified schematic illustration of an embodiment, it should be appreciated that although laser 126 is shown as a distinct functional unit in FIG. 1, in practice it may take the place of spectrometer 112; or a fiber optic and lens system may be used to selectively focus the laser beam provided by laser 126 onto conjugate focal plane 124 so that spectrometer 112 may still be in place. Other embodiments may employ other types of optical coupling mechanisms.) This laser beam passes through conjugate focal plane 124 and is projected through the embodiment optical system of FIG. 1 onto a corresponding spot in the object plane associated with a particular magnification and working distance of the embodiment optical system.

Reflected, emitted, or scattered light from optically excited spectroscopic measurements at the object plane (e.g., Raman spectroscopy, Laser-Induced Breakdown Spectroscopy, or Fluorescence and Reflectance spectroscopy) returns through the same embodiment optical system and is imaged back onto conjugate focal plane 124 where the light may be collected through a variety of conventional and novel optical spectroscopic systems so that the returned light may be spectrally analyzed. The diffraction-limited spectroscopic scanning capability may be provided in some embodiments by ensuring that the incident light rays on a focal plane is essentially normal to the focal plane. This configuration provides a convenient flat planar surface that may be easily scanned with two-axis mechanisms coupled with a probehead that supports axisymmetric beam geometry. In other embodiments the probehead may be designed to tilt in order to accommodate rays that are not normal to the focal plane or the two-axis mechanism scanned about a curved surface.

In optical spectroscopic measurements such as Raman spectroscopy, a laser may generate fluorescence in the glass of a lens when passed through that lens. This fluorescence may significantly degrade the quality of the spectroscopic measurement. In a particular embodiment, lens fluorescence may be controlled by selecting glasses that have low fluorescence cross-sections, and by generating an overall optical design that rejects that collection of fluorescence by minimizing the amount of fluorescence generated in an optical element that may be imaged onto a spectroscopic collection aperture located in conjugate focal plane 124.

Illuminators 120 may be placed about lens cell 102 to illuminate object 106 with electromagnetic radiation of various wavelengths. For example, illuminators 120 may comprise light emitting diodes of various spectral output or lasers to illuminate object 106.

Figure 2:
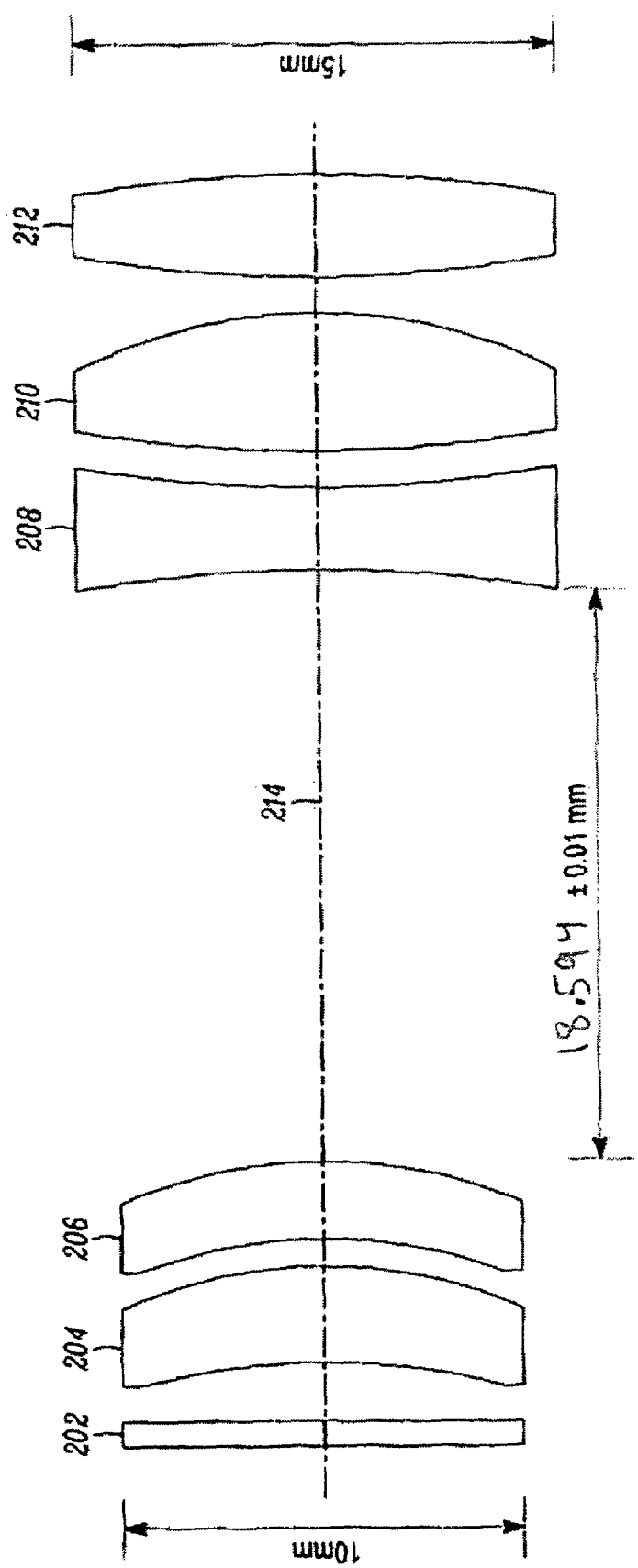
FIG. 2 illustrates a first lens cell according to the embodiment of FIG. 1.

An embodiment for lens cell 102 is illustrated in FIG. 2. Lens cell 102 is a five element lens with window 202, and includes lens elements 204, 206, 208, 210, and 212. The optical axis is labeled 214. The object to be imaged would be to the left of window 202 illustrated in FIG. 2. For the particular embodiment of FIG. 2, the nominal diameter of window 202 and lens elements 204 and 206 is indicated as 10 mm, and the nominal diameter of lens elements 208, 210, and 212 is indicated as 15 mm. The spacing between window 202 and lens element 204, lens elements 204 and 206, lens elements 208 and 210, and lens elements 210 and 212 are each 1 mm for the embodiment of FIG. 2. The spacing between lens element 206 and lens element 208 is 18.594 mm with a tolerance of ±0.01 mm, as indicated in FIG. 2. For the embodiment of FIG. 2 the tolerance for each element spacing is approximately ±0.01 mm.

For some embodiments, window 202 may comprise Sapphire or Quartz, such as for example Suprasil, a synthetic Quartz. Suprasil is a registered trademark of Heraeus Quarzschmelze G.m.b.H., a German corporation. Other embodiments may utilize a different glass material. For this particular embodiment, the index of refraction, n, is n=1.46, and the Abbe number, V, is V=67.8. For some embodiments, the planar surfaces of window 202 have an anti-reflection coating. The irregularity tolerance for the surfaces of window 202 is approximately an eighth of a wavelength, λ/8. The C.A. (Clear Aperture) diameter is 9.0±0.25 mm. The thickness is 1 mm with a tolerance of ±0.01 mm. The edge diameter is 10.0 mm with a tolerance of +0.0 mm and −0.5 mm. The edges of window 202 may be beveled at a 45° angle to a maximum face width of 0.1 mm.

Lens element 204 is a positive meniscus lens element. The radius of curvature for its left (relative to the orientation of FIG. 2) surface is 21.60 mm with a radius tolerance of 0.06 mm and with an irregularity tolerance of λ/8. The radius of curvature for its right surface is 10.44 mm with a radius tolerance of 0.02 mm and with an irregularity tolerance of λ/8. The C.A. diameter for both surfaces is 9.0 mm with a tolerance of +0.5 mm and −0.0 mm. The edge diameter is 10.00 mm with a tolerance of +0.00 mm and −0.05 mm. The thickness is 3.00 mm with a tolerance of ±0.01 mm.

For the embodiment of FIG. 2, lens element 204 comprises Schott K5 glass. Schott is a registered trademark of Schott Aktiengesellschaft, a German corporation, with USA subsidiary Schott North America, Inc., at Elmsford, N.Y. USA. Schott K5 is an optical glass product of Schott Aktiengesellschaft, with n=1.52 and V=59.3. For the particular embodiment of FIG. 2, the edges of lens element 204 are beveled at 45° to a maximum face width of 0.1 mm.

Lens element 206 is a negative meniscus lens element. The radius of curvature for its left surface is 8.17 mm with a radius tolerance of 0.01 mm and an irregularity tolerance of λ/8. The C.A. diameter for the left surface is 9.0 mm with a tolerance of +1.0 mm and −0.0 mm. The radius of curvature for the right surface is 10.97 mm with a radius tolerance of 0.02 mm and an irregularity tolerance of λ/8. The C.A. diameter of the right surface is 10.0 mm with a tolerance+1.0 mm and −0.0 mm. The edge diameter is 10.00 mm with a tolerance of +0.00 mm and −0.03 mm. The thickness is 2.00 mm with a tolerance of ±0.01 mm. The glass is Schott K5, with n=1.52 and V=59.3, and the edges are beveled at 45° to a maximum face width of 0.1 mm.

Lens element 208 is a biconcave lens element. The radius of curvature for its left surface is 38.63 mm, with a radius tolerance of 0.06 mm and an irregularity tolerance of λ/8. The C.A. diameter for the left surface is 14.00 mm with a tolerance of ±0.25 mm. The radius of curvature for the right surface is 44.52 mm with a radius tolerance of 0.04 mm and an irregularity tolerance of λ/8. The C.A. diameter of the right surface is 14.00 mm with a tolerance of ±0.25 mm. The edge diameter is 15.00 mm with a tolerance of +0.00 mm and −0.03 mm. The thickness is 2.00 mm with a tolerance of ±0.02 mm. The glass is Ohara S-NBH51, with n=1.75 and V=35.3, and the edges are beveled at 45° to a maximum face width of 0.1 mm. Ohara is a registered trademark of Ohara, Inc., headquartered in Sagamihara-Shi Kanagawa, Japan, and Ohara S-NBH51 is a product of Ohara, Inc.

Lens element 210 is a biconvex lens element. The radius of curvature for its left surface is 50.81 mm with a radius tolerance of 0.06 mm and an irregularity tolerance of λ/8. The C.A. diameter for the left surface is 14.00 mm with a tolerance of ±0.25 mm. The radius of curvature for the right surface is 16.95 mm with a radius tolerance of 0.02 mm and an irregularity tolerance of λ/8. The C.A. diameter of the right surface is 14.00 mm with a tolerance of ±0.25 mm. The edge diameter is 15.00 mm with a tolerance of +0.00 mm and −0.03 mm. The thickness is 4.00 mm with a tolerance of ±0.01 mm. The glass is Ohara S-FPL53, with n=1.44 and V=95.0, and the edges are beveled at 45° to a maximum face width of 0.1 mm.

Lens element 212 is a biconvex lens element. The radius of curvature for its left surface is 46.58 mm with a radius tolerance of 0.06 mm and an irregularity tolerance of λ/8. The C.A. diameter for the left surface is 14.00 mm with a tolerance of ±0.25 mm. The radius of curvature for the right surface is 60.13 mm with a radius tolerance of 0.06 mm and an irregularity tolerance of λ/8. The C.A. diameter of the right surface is 14.00 mm with a tolerance of ±0.25 mm. The edge diameter is 15.00 mm with a tolerance of +0.00 mm and −0.03 mm. The thickness is 3.00 mm with a tolerance of ±0.01 mm. The glass is Schott K5, with n=1.52 and V=59.3, and the edges are beveled at 45° to a maximum face width of 0.1 mm.

FIG. 8 illustrates an embodiment for lens cell 104, comprising two lens elements, lens elements 302 and 304. The optical axis is labeled 306. The distance between lens element 302 and lens element 304 is 15.01 mm with a tolerance of ±0.01 mm.

Lens element 302 is a biconcave lens element. The radius of curvature for its left surface is 59.21 mm with a radius tolerance of 0.06 mm and an irregularity tolerance of λ/8. The C.A. diameter for the left surface is 11.00 mm with a tolerance of ±0.25 mm. The radius of curvature for the right surface is 12.88 mm with a radius tolerance of 0.06 mm and an irregularity tolerance of λ/8. The C.A. diameter of the right surface is 11.00 mm with a tolerance of ±0.25 mm. The edge diameter is 12.00 mm with a tolerance of +0.00 mm and −0.03 mm. The thickness is 2.00 mm with a tolerance of ±0.01 mm. The glass is Schott K5, with n=1.52 and V=59.3, and the edges are beveled at 45° to a maximum face width of 0.1 mm.

Lens element 304 is a biconvex lens element. The radius of curvature for its left surface is 178.78 mm with a radius tolerance of 0.20 mm and an irregularity tolerance of λ/8. The C.A. diameter for the left surface is 14.00 mm with a tolerance of ±0.25 mm. The radius of curvature for the right surface is 24.53 mm with a radius tolerance of 0.06 mm and an irregularity tolerance of λ/8. The C.A. diameter of the right surface is 14.00 mm with a tolerance of ±0.25 mm. The edge diameter is 15.00 mm with a tolerance of +0.00 mm and −0.03 mm. The thickness is 3.00 mm with a tolerance of ±0.01 mm. The glass is Schott F2, with n=1.62 and V=36.2, and the edges are beveled at 45° to a maximum face width of 0.1 mm.

The glass materials and thicknesses described in the embodiments were chosen to help enable laser-excited spectroscopic investigations, where the bandpass of the optical system is designed to cover the wavelength range of 335 nm to 950 nm, and to help reduce lens fluorescence. The wide bandpass may be achieved through the use of high ultraviolet transmissive materials and thin lenses that are more absorbing in the ultraviolet, and slight focus shifts between the lens cells outside of the chromatic aberration-corrected visible range. Laser-excited lens fluorescence may be minimized by the use of low fluorescence optical materials in the geometric configuration of lenses.

It is expected that for some embodiments, the optical glass fluorescence rejection may be on the order of $10^5$ to $10^7$, depending on a particular lens location within the optical system. In addition to the large focal shifts between the lens cells to cover imaging across wide image scales, small focus shifts may be used to facilitate imaging of rough surfaces that exceed the depth of focus, and to precisely couple a high resolution laser spot onto microscopic features. When imaging unimproved surfaces, multiple images taken at very small changes in working distance may be acquired and compressed into a single in-focus image by eliminating out-of-focus portions of the resultant image cube. The locations of the in-focus regions may be correlated with their elevation normal to the image plane such that a high-resolution three-dimensional map may be available for precise laser targeting at around a 10 micron scale. This capability may be important in achieving efficient laser coupling into microscopic features of interest, particularly for laser spectroscopic measurements sensitive to the quantity of laser flux delivered to a microscopic target surface feature (e.g., LIBS).

Figure 3:
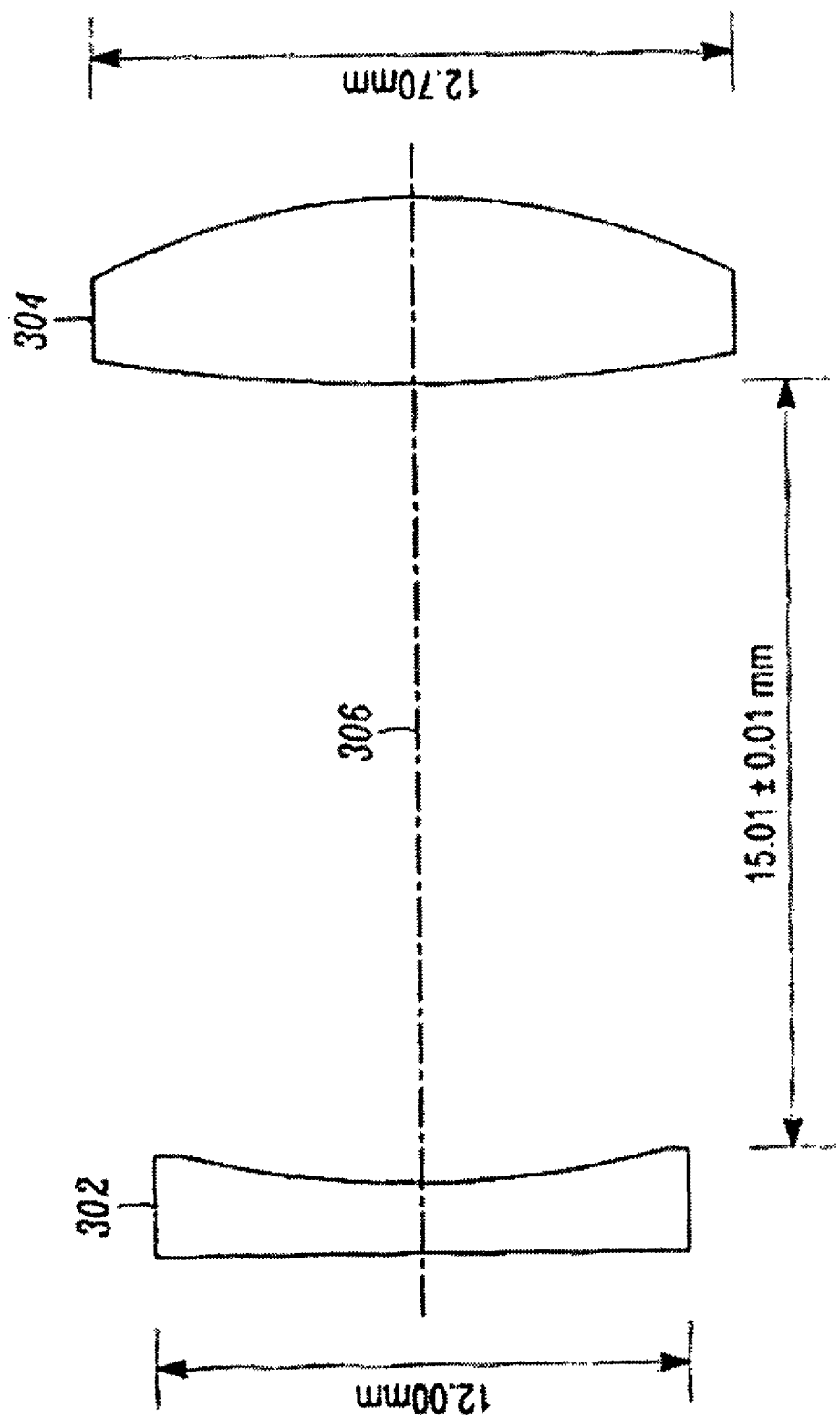
FIG. 3 illustrates a second lens cells according to the embodiment of FIG. 1.

The sequential ordering of lens elements 204, 206, 208, 210, and 212 in the embodiment of FIG. 2 from left to right is chosen merely for convenience, where obviously the sequential ordering of these lens elements could have been illustrated from right to left. A similar remark applies to lens elements 302 and 304 in the embodiment of FIG. 3.

Other embodiments may use glass materials and indices of refraction other than those disclosed herein. For example, some embodiments may be such that the index of refraction and Abbe number for all or some lens elements varies by perhaps up to 25% from the corresponding optical parameter values described previously. Furthermore, other embodiments may have lens elements with radii of curvature different from those disclosed herein, different thicknesses, or different relative spacing between the lens elements. For example, these parameters in other embodiments may vary up to 25% or more from the values given with respect to the embodiment of FIGS. 2 and 3. Also, the particular range of tolerances and surface irregularity tolerances disclosed herein are provided merely an as example, where other embodiments may have different amounts of tolerances.

Furthermore, it is important to note that the radius of curvature, inter-element spacing, thickness, and edge diameter for each lens element disclosed in this Description of Embodiments may be scaled by some scale factor s to provide other embodiments. That is, the dimensioned parameters provided for the particular embodiment disclosed above may be multiplied by some scale factor s. This results in an imaging system in which the image size and working distance (focusing range) is also scaled accordingly.

It is expected that some embodiments may realize a magnification in the range of 0 to 30. (In practice, the magnification is theoretically not exactly 0, as should be well known, but some number substantially close to 0 to indicate that a very far-away object is imaged at the focal planes.) It is expected that some embodiments may realize an even greater range of magnification, perhaps from 0 to 250, depending upon how well the lens tolerances may be controlled. Some embodiments are expected to have a working distance of 6 mm to infinity.

Various modifications may be made to the described embodiments without departing from the scope of the invention as claimed below.

What is claimed is:

1. An optical system comprising:
a first lens cell comprising in a sequential order
 a positive meniscus lens element;
 a negative meniscus lens element;
 a biconcave lens element;
 a first biconvex lens element; and
 a second biconvex lens element; and
a second lens cell comprising in a sequential order
 a biconcave lens element; and
 a biconvex lens element,
wherein
the negative meniscus and biconcave lens elements of the first lens cell are separated by a first distance to within 25% of 18.594s mm, where s is some positive-valued scale factor; and
the biconcave and biconvex lens elements of the second lens cell are separated by a second distance to within 25% of 15.01s mm.

2. The optical system as set forth in claim 1, wherein the positive meniscus lens element and the negative meniscus lens element are separated by a third distance to within 25% of s mm; and the first biconvex lens element and the second biconvex lens element are separated by the third distance.

3. The optical system as set forth in claim 2, wherein
the positive meniscus lens element of the first lens cell has a first surface with a radius of curvature to within 25% of range of 21.60s mm, and has a second surface with a radius of curvature to within 25% of 10.44s mm;
the negative meniscus lens element of the first lens cell has a first surface with a radius of curvature to within 25% of 8.17s mm, and has a second surface with a radius of curvature to within 25% of 10.97s mm;
the biconcave lens element of the first lens cell has a first surface with a radius of curvature to within 25% of 38.63s mm, and has a second surface with a radius of curvature to within 25% of 44.52s mm;
the first biconvex lens element of the first lens cell has a first surface with a radius of curvature to within 25% of 50.81s mm, and has a second surface with a radius of curvature to within 25% of 16.95s mm; and
the second biconvex lens element of the first lens cell has a first surface with a radius of curvature to within 25% of 21.60s mm, and has a second surface with a radius of curvature to within 25% of 10.44s mm.

4. The optical system as set forth in claim 3, wherein
the biconcave lens element of the second lens cell has a first surface with a radius of curvature to within 25% of 59.21s mm, and has a second surface with a radius of curvature to within 25% of 12.88s mm; and
the biconvex lens element of the second lens cell has a first surface with a radius of curvature to within 25% of 178.78s mm, and has a second surface with a radius of curvature to within 25% of 24.53s mm.

5. The optical system as set forth in claim 2, wherein
the biconcave lens element of the second lens cell has first surface with a radius of curvature to within 25% of 59.21s mm and has a second surface with a radius of curvature to within 25% of 12.88s mm; and
the biconvex lens element of the second lens cell has a first surface with a radius of curvature to within 25% of 178.78s mm, and has a second surface with a radius of curvature to within 25% of 24.53s mm.

6. An optical system comprising:
a first lens cell comprising in a sequential order
 a positive meniscus lens element;
 a negative meniscus lens element;
 a biconcave lens element;
 a first biconvex lens element; and
 a second biconvex lens element; and a second lens cell comprising in a sequential order
    a biconcave lens element; and
    a biconvex lens element,
wherein
    the negative meniscus and biconcave lens elements of the first lens cell are separated by a first distance to within 10% of 18.594s mm, where s is some positive-valued scale factor; and
    the biconcave and biconvex lens elements of the second lens cell are separated by a second distance to within 10% of 15.01s mm.

7. The optical system as set forth in claim 6, wherein
    the positive meniscus lens element of the first lens cell has a first surface with a radius of curvature to within 10% of range of 21.60s mm, and has a second surface with a radius of curvature to within 10% of 10.44s mm;
    the negative meniscus lens element of the first lens cell has a first surface with a radius of curvature to within 10% of 8.17s mm, and has a second surface with a radius of curvature to within 10% of 10.97s mm;
    the biconcave lens element of the first lens cell has a first surface with a radius of curvature to within 10% of 38.63s mm, and has a second surface with a radius of curvature to within 10% of 44.52s mm;
    the first biconvex lens element of the first lens cell has a first surface with a radius of curvature to within 10% of 50.81s mm, and has a second surface with a radius of curvature to within 10% of 16.95s mm; and
    the second biconvex lens element of the first lens cell has a first surface with a radius of curvature to within 10% of 21.60s mm, and has a second surface with a radius of curvature to within 10% of 10.44s mm.

8. The optical system as set forth in claim 7, wherein
    the biconcave lens element of the second lens cell has a first surface with a radius of curvature to within 10% of 59.21s mm, and has a second surface with a radius of curvature to within 10% of 12.88s mm; and
    the biconvex lens element of the second lens cell has a first surface with a radius of curvature to within 10% of 178.78s mm, and has a second surface with a radius of curvature to within 10% of 24.53s mm.

9. The optical system as set forth in claim 6, wherein the biconcave lens element of the second lens cell has first surface with a radius of curvature to within 10% of 59.21s mm and has a second surface with a radius of curvature to within 10% of 12.88s mm; and
    the biconvex lens element of the second lens cell has a first surface with a radius of curvature to within 10% of 178.78s mm, and has a second surface with a radius of curvature to within 10% of 24.53s mm.

10. An optical system comprising:
a first lens cell comprising in a sequential order
    a positive meniscus lens element having an index of refraction to within 25% of 1.52 and an Abbe number to within 25% of 59.3;
    a negative meniscus lens element having an index of refraction to within 25% of 1.52 and an Abbe number to within 25% of 59.3;
    a biconcave lens element having an index of refraction to within 25% of 1.75 and an Abbe number to within 25% of 35.3;
    a first biconvex lens element having an index of refraction to within 25% of 1.44 and an Abbe number to within 25% of 95.0; and
    a second biconvex lens element having an index of refraction to within 25% of 1.52 and an Abbe number to within 25% of 59.3; and
a second lens cell comprising in a sequential order
    a biconcave lens element having an index of refraction to within 25% of 1.52 and an Abbe number to within 25% of 59.3; and
    a biconvex lens element having an index of refraction to within 25% of 1.52 and an Abbe number to within 25% of 59.3;
wherein:
    the negative meniscus and biconcave lens elements of the first lens cell are separated by a first distance to within 25% of 18.594s mm, where s is some positive-valued scale factor;
    the biconcave and biconvex lens elements of the second lens cell are separated by a second distance to within 25% of 15.01s mm;
    the positive meniscus lens element and the negative meniscus lens element are separated by a third distance to within 25% of s mm;
    the first biconvex lens element and the second biconvex lens element are separated by the third distance;
    the positive meniscus lens element of the first lens cell has a first surface with a radius of curvature to within 25% of the range of 21.60s mm, and has a second surface with a radius of curvature to within 25% of 10.44s mm;
    the negative meniscus lens element of the first lens cell has a first surface with a radius of curvature to within 25% of the range of 8.17s mm, and has a second surface with a radius of curvature to within 25% of 10.97s mm;
    the biconcave lens element of the first lens cell has a first surface with a radius of curvature to within 25% of the range of 38.63s mm, and has a second surface with a radius of curvature to within 25% of 44.52s mm;
    the first biconvex lens element of the first lens cell has a first surface with a radius of curvature to within 25% of the range of 50.81s mm, and has a second surface with a radius of curvature to within 25% of 16.95s mm;
    the second biconvex lens element of the first lens cell has a first surface with a radius of curvature to within 25% of the range of 21.60s mm, and has a second surface with a radius of curvature to within 25% of 10.44s mm;
    the biconcave lens element of the second lens cell has a first surface with a radius of curvature to within 25% of the range of 59.21s mm, and has a second surface with a radius of curvature to within 25% of 12.88s mm; and
    the biconvex lens element of the second lens cell has a first surface with a radius of curvature to within 25% of the range of 178.78s mm, and has a second surface with a radius of curvature to within 25% of 24.53s mm.

11. The optical system as set forth in claim 10, further comprising:
    a spectrometer to receive electromagnetic radiation imaged by the optical system.

\* \* \* \* \*